United States Patent
Countouris

(10) Patent No.: US 6,899,047 B2
(45) Date of Patent: May 31, 2005

(54) MAST AND METHOD OF MANUFACTURING A STRUCTURAL MEMBER FOR A BOAT

(75) Inventor: Paul Countouris, Etobicoke (CA)

(73) Assignee: Spartec Composites Inc., Erin (CA)

( * ) Notice: Subject to any disclaimer, the term of this patent is extended or adjusted under 35 U.S.C. 154(b) by 0 days.

(21) Appl. No.: 10/686,611

(22) Filed: Oct. 17, 2003

(65) Prior Publication Data

US 2005/0016429 A1 Jan. 27, 2005

(30) Foreign Application Priority Data

Jul. 21, 2003 (CA) .............................. 2435617

(51) Int. Cl.$^7$ .............................................. B63B 15/00
(52) U.S. Cl. ......................................................... 114/90
(58) Field of Search ................................ 114/89, 90, 97

(56) References Cited

U.S. PATENT DOCUMENTS

| | | | | |
|---|---|---|---|---|
| 4,200,480 A | * | 4/1980 | Wolinski et al. ............ | 156/294 |
| 4,834,013 A | * | 5/1989 | Smart .......................... | 114/90 |
| 4,909,170 A | * | 3/1990 | Smart .......................... | 114/90 |

* cited by examiner

Primary Examiner—Stephen Avila
(74) Attorney, Agent, or Firm—Dimock Stratton LLP; Mark B. Eisen

(57) ABSTRACT

A mast for a sailboat and a method of manufacturing the mast or other structural member for a boat, which is produced in a female mold. Any augmentation of the deflection resistance of the structural member is provided by fabric-resin fabric added to the interior surfaces of the until the desired deflection characteristics are achieved. The mast is formed from at least two parts, which in the preferred embodiment are joined together by seam anchor strips, preferably in conjunction with a fabric-resin insert that overlays the interior of the seam strip and extends over a portion of the mast half body. If additional fabric-resin fabric is required after testing, it can be added to the inside surfaces of the mast parts before the trailing seam is sealed. The structural member of the invention accordingly requires no external finishing, and the appearance, taper and aerodynamic characteristics thereof are fully determined by the mold, resulting in a consistently accurate, uniform and aesthetically pleasing product that is considerably less expensive to produce than a conventional fabric-resin structural member and substantially stronger than a comparable aluminum structural member.

10 Claims, 3 Drawing Sheets

MAST AND METHOD OF MANUFACTURING A STRUCTURAL MEMBER FOR A BOAT

FIELD OF THE INVENTION

This invention relates to boats. In particular, this invention relates to a mast and other structural members for a boat and to a method of manufacturing same.

BACKGROUND OF THE INVENTION

A fabric-resin system such as fibreglass is popularly used as the primary component in the manufacture of boats, because of both its versatility and its weather-resistant qualities. For decades many of the structural components of pleasure boats have been manufactured from fibreglass or another fabric-resin system, for example more recently, carbon-graphite. In such systems a fabric formed from fibres of the selected composition is laid over a mold, and impregnated with a curable resin which, when cured, imparts rigidity to the fabric and adheres it to adjacent fabric layers. Through the overlapping of adjacent fabric pieces and the building of successive layers, a strong and waterproof structural coating is produced that is also resistant to weather and general wear and tear.

One of the most common boat components manufactured from a fabric-resin system is the mast. A simple mast, usually found on a small pleasure sailboat, is cylindrical. The mast in a large (e.g. 100 foot) pleasure sailboat is rarely cylindrical, as it has been found that an oval cross-section is more aerodynamic. The aerodynamic characteristics of the mast are thus more important in an oval mast, which can be fixed, the base of the mast being bolted directly to the boat deck so that the mast experiences variable drag depending upon the angle of the boat to the wind; or rotating (more common on a multi-hull boat), whereby the mast is mounted on a rotary joint and is capable of turning to minimize drag as the orientation of the boat changes relative to the wind. In either case the mast must be self-standing, and must not only carry the full weight of the mainsail, but must also resist the moment of force imparted by the wind when the mainsail is fully unfurled, which can be considerable.

In a large pleasure sailboat the mast can approach the length of the boat, and is anchored only at its base. As such, the mast must be able to bear significant forces over its entire length, and preferably should be able to flex to accommodate a sudden change in the direction of the force. Fabric-resin systems are ideal for such a structural member, as they tend to be light but very strong and weather-resistant, and suitably flexible. Carbon-graphite, for example, weighs about one half of the comparable amount of aluminum but has considerably greater strength, particularly in the lateral direction (i.e. against the sides of the oval mast) and flexibility.

The aerodynamic qualities of a mast are determined, in part, by how accurately and uniformly the mast is manufactured A conventional fabric-resin mast, formed for example from fibreglass, is produced in two parts, as front and back halves, which are then joined together. Each half is created by applying the resin-impregnated fabric over an aluminum mandrel, which functions as a male mould. After joining the halves together the mast is tested for strength by deflection testing. If the mast does not have the required strength (i.e. resistance to deflection) in the lateral and fore-aft directions, as indicated by over-flexing at specific points, more fabric-resin must be wrapped around the exterior of the mast to augment the weak points. This tends to make the exterior surface of the mast uneven. To compensate, often a curable filling compound is applied and carefully sanded, to restore the uniformity in taper and aerodynamic shape of the exterior surface of the mast, and to create an aesthetically pleasing finished appearance. Only once the mast is completely finished to the required strength and aesthetic characteristics is the finishing paint and hardware applied.

This method of manufacturing the mast presents a number of disadvantages. The fabric-resin augmentation and patching/refinishing steps are extremely laborious. The application and sanding of the fabric-resin and filling compound must be performed manually, and frequently many hundreds of hours of manual labour are required to bring a mast to the strength and aesthetic appearance required by boat owners, which can take several months. The quality of the finish is dependent upon the skill of the finishing labourers. Moreover, the filling compound is denser than the fabric-resin, so the finishing process adds unnecessary weight to the mast without adding any structural strength or integrity. In fact, the filling compound is not as strong as the fabric-resin compound and does not adhere well to a cured fabric-resin such as fibreglass or carbon-graphite, so over time the filler compound will crack and separate from the mast. This is aesthetically unappealing, reduces the aerodynamic characteristics of the mast, and can reduce the longevity of the mast due to water seepage.

Once the mast has been finished and painted, a track for hoisting the mainsail must be affixed to the aft (trailing) side of the mast. In use the track will tend to be pulled away from the mast by the forces acting on the sail, so where the track is affixed by bolts typically the track is bolted to the mast every six inches or so, in an attempt to distribute the force of the track over the entire length of the mast. However, in a conventional mast the concentration of stress around the drill holes can result in cracking, which can allow the track to separate from the mast and occasionally allow water to seep into the mast. The track can be affixed to the mast by glue, in which case the track is held along its entire length, but the pulling force of the mainsail can still cause the track to separate from the mast, in this case peeling off the finishing paint with it, again rendering the mast susceptible to cracking and water seepage.

SUMMARY OF THE INVENTION

The present invention provides a mast or other structural member for a boat, and a method of manufacturing the mast and other structural members for a boat. The structural member of the invention requires no exterior finishing; if augmentation of mast strength is required after the initial molding of a mast, additional resin-impregnated fabric is added to the interior surfaces of the mast until the desired deflection characteristics are achieved. No subsequent refinishing is required, because the interior surface is not visible and is completely concealed from the elements in the assembled mast or other structural member. Thus, in the case of a mast, the addition of fabric-resin layers does not alter the aerodynamic specifications or taper of the mast, or affect its aesthetic appearance.

The invention accomplishes this by manufacturing the mast or other structural member of the invention as parts, preferably two side halves, which in the preferred embodiment are joined together by seam anchor strips. Each half is fabricated in a female mold, which defines the finished exterior shape and appearance.

In the case of a mast for example, the fabric-resin is applied over the mold, building up the thickness of each mast half toward the interior of the mast. When completed the mast halves are joined along the leading seam, in the preferred embodiment by affixing each leading edge into opposed channels of an extruded seam anchor strip, using an adhesive such as methacrylate or any other suitable glue or epoxy. Preferably a fabric-resin insert is then applied to overlay the interior of the seam strip and extend over a portion of the mast half body, to augment the seam.

The mast is then tested for deflection. If additional fabric-resin layers are required, they can be added to the inside surfaces of the mast halves before the trailing seam is sealed. When the required strength has been achieved, the mast halves are joined along the trailing seam, preferably by affixing each trailing edge into opposed channels of a seam anchor strip which provides an external profile in the form of a lanyard track, thus integrating the lanyard track into the mast and reducing the likelihood of separation.

The mast of the invention accordingly requires no external finishing, and can be completed in a matter of days rather than months. The appearance, taper and aerodynamic characteristics of the mast of the invention are determined entirely by the molds, so the degree of skill (or lack thereof) on the part of the fabricators does not affect the external characteristics of the mast. This results in a consistently accurate, uniform and aesthetically pleasing mast that is fully weather-resistant, while being considerably less expensive to produce than a conventional fabric-resin mast and substantially stronger than a comparable aluminum mast.

The method of the invention can be equally applied to other structural members, for a boat or other application, although the advantages of the invention are more fully obtained in the case of a boat, which is subjected to harsh conditions.

The present invention thus provides a structural member for a boat, comprising at least two complementary parts configured to be joined along two or more longitudinal seams, the parts each being formed in at least one female mold defining an exterior of the structural member; and for each seam, a seam anchor strip comprising substantially opposed channels each defined between an exterior flange and an interior flange, whereby each seam is joined along the seam anchor strip by an adhesive, to produce an integral structural member.

The present invention further provides a mast for a sailboat, comprising at least two complementary parts configured to be joined along two or more longitudinal seams, the parts each being formed in at least one female mold defining an exterior of the mast; and for each seam, a seam anchor strip comprising substantially opposed channels each defined between an exterior flange and an interior flange, one of the seam anchor strips being provided with an external profile comprising a track for slidably receiving rigging hardware, whereby each seam is joined along the seam anchor strip by an adhesive, to produce an integral structural member.

The present invention further provides a method of manufacturing a structural member, comprising the steps of: a. Placing resin-impregnated fabric into at least one female mold to create complementary parts of the structural member, up to a desired thickness, for joining along at least two seams; b. When the parts have cured, removing the parts from the mold and joining one of the at least two seams by applying adhesive and substantially opposed channels in a seam anchor strip over complementary edges of the one seam; c. When the adhesive has set, testing the structural member for deflection, and if the deflection testing indicates that the structural member has not achieved a desired deflection resistance, applying further resin-impregnated fabric along an interior surface of the structural member; d. Once the structural member has achieved the desired deflection resistance, applying adhesive and substantially opposed channels in a seam anchor strip over complementary edges of the other of the at least two seams to complete the assembly of the structural member.

BRIEF DESCRIPTION OF THE DRAWINGS

In drawings which illustrate by way of example only a preferred embodiment of the invention.

DETAILED DESCRIPTION OF THE INVENTION

Figure 1:
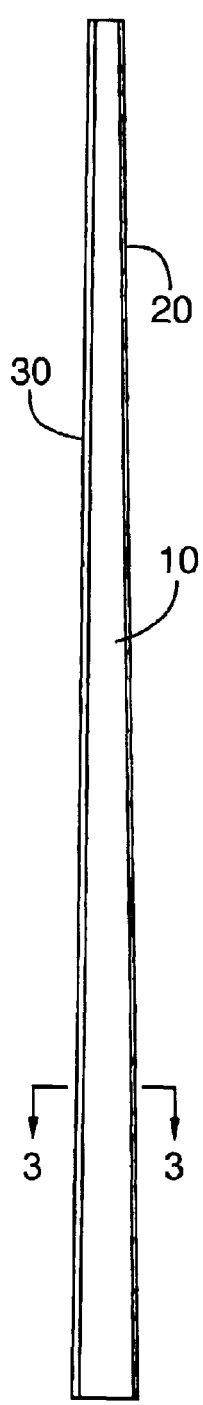
FIG. 1 is an elevational view of a mast constructed according to the invention.

FIG. 1 illustrates a mast 10 constructed according to the invention. In the preferred embodiment the mast is formed from a carbon-graphite composite fibre fabric impregnated with epoxy resin; however it will be appreciated that fibreglass and other types of fabric-resin systems can be used to fabricate the mast halves.

The invention will be hereinafter described in the context of a mast 10 according to the invention, however it will be appreciated that the structure of the mast 10, and the method of producing same hereinafter described, are equally applicable to other structural members, especially those suitable for a boat.

Figure 2:
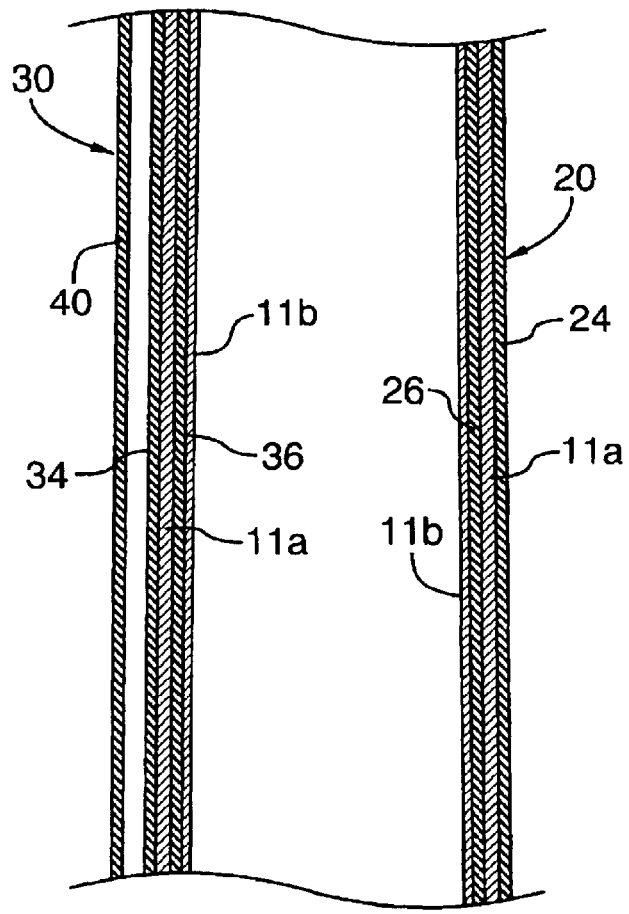
FIG. 2 is a partial cross-sectional elevation of the mast of FIG. 1.
Figure 4:
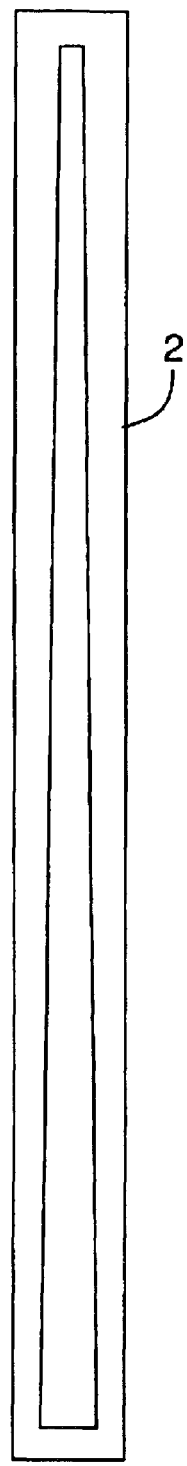
FIG. 4 is a plan view of a mold for the mast of FIG. 1.
Figure 3:
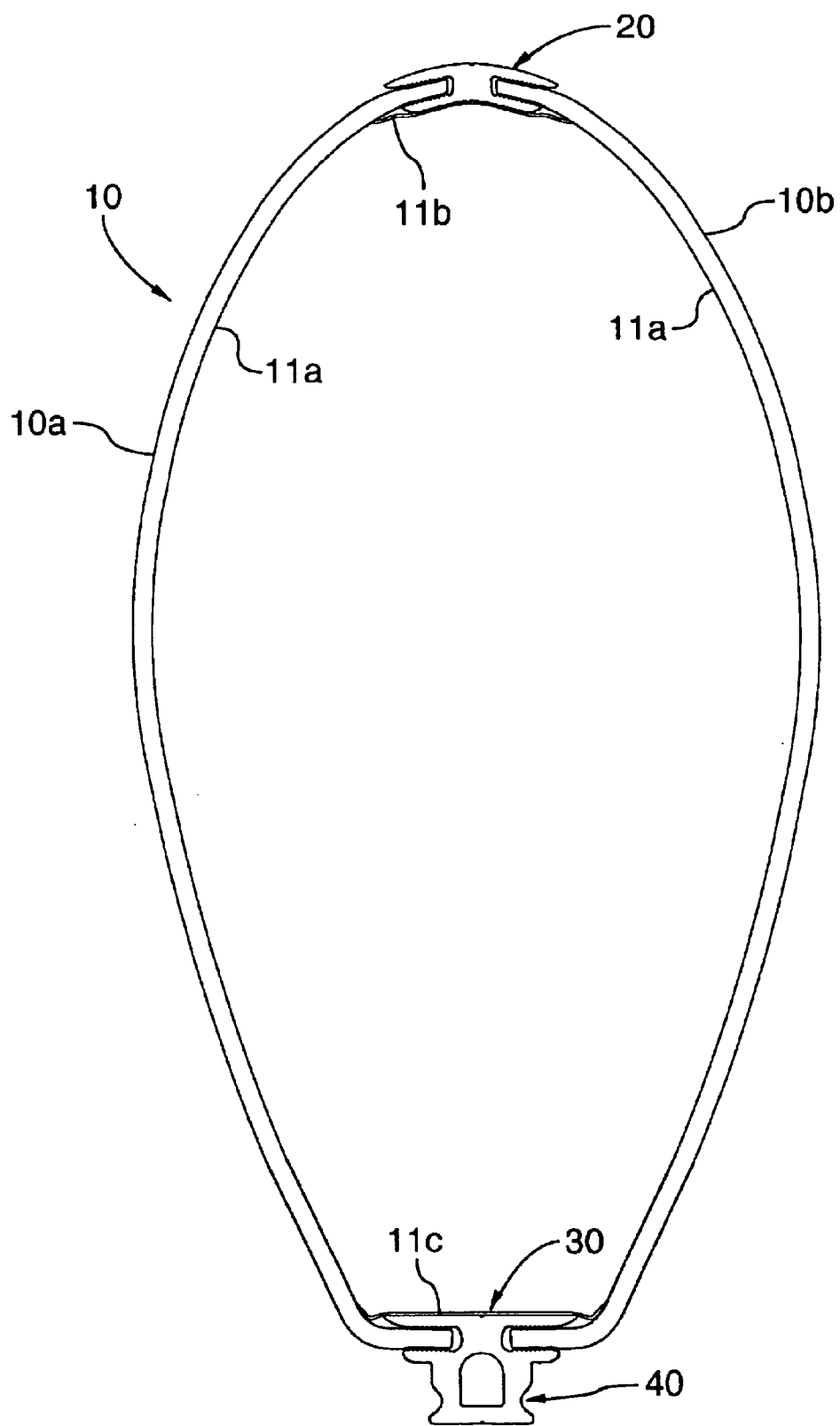
FIG. 3 is a cross-sectional plan view of the mast of FIG. 1 taken along 3—3.

The mast 10 is formed from mast parts, preferably mast halves 10a, 10b as illustrated in FIG. 2. In the preferred embodiment each mast half is composed of a fabric-resin body 14. The mast halves 10a, 10b are formed to the desired size, aerodynamic configuration, and axial taper as determined by a female mold 2, an example of which is illustrated in FIG. 3. Typically a pair of molds 2 would be required for a mast 10, each mold 2 being formed to the configuration and length of the respective mast half 10a or 10b that it is used to create. However, for other structural components that are not tapered, for example a spar or boom, it would be possible to use a single mold 2 to create both halves (or three equal thirds, etc.) of the structural member for subsequent joining.

In the preferred embodiment each mast half is fabricated with the finishing surface 12 already fixed. The finishing surface 12 may conventionally comprise one or more layers of a paint suitable for adhesion to the carbon-graphite fabric-resin used to form the mast halves 10a, 10b, for example a polyester gelcoat paint. The paint surface 12 is accordingly applied to the mold 2 before the resin-impregnated fabric, as is known in the art.

Once the fabric-resin has cured, the mast halves 10a, 10b are removed from the molds 2, for partial joining, deflection (and/or other) testing and, if necessary, fabric-resin augmentation, following which joining is completed, all as described below.

Figure 5:
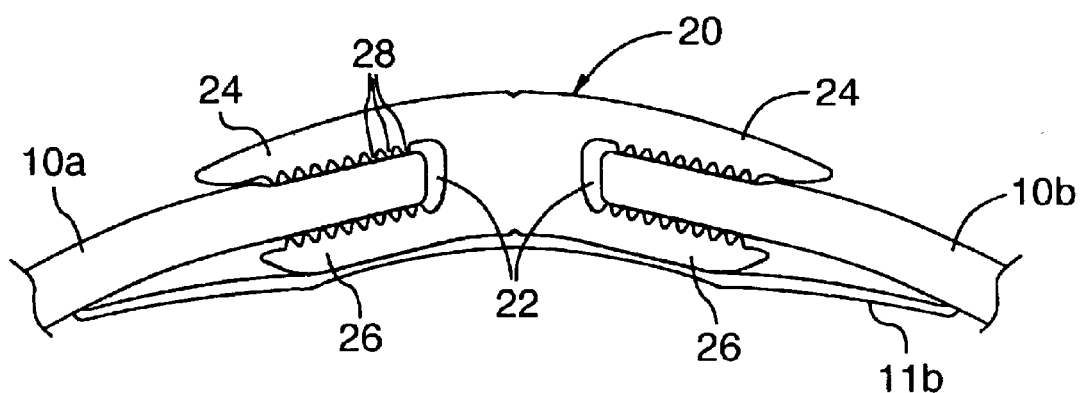
FIG. 5 is a cross-section of the leading seam anchor.

The seams between mast halves 10a, 10b are preferably joined along their entire lengths by seam anchoring strips 20, 30. FIG. 5 illustrates a first preferred seam anchor strip 20 for the leading edges, having substantially opposed channels 22 each defined between an exterior flange 24 and an interior flange 26, and a plain external profile for reduced wind resistance. The flanges 24, 26 are preferably provided with teeth 28 for lateral engagement of an adhesive, preferably methacrylate, but the adhesive could be any other suitable glue or epoxy. The adhesive, in conjunction with the teeth 28 in the channels 22, secure the leading edges 16 of the must halves 10a, 10b.

Figure 6:
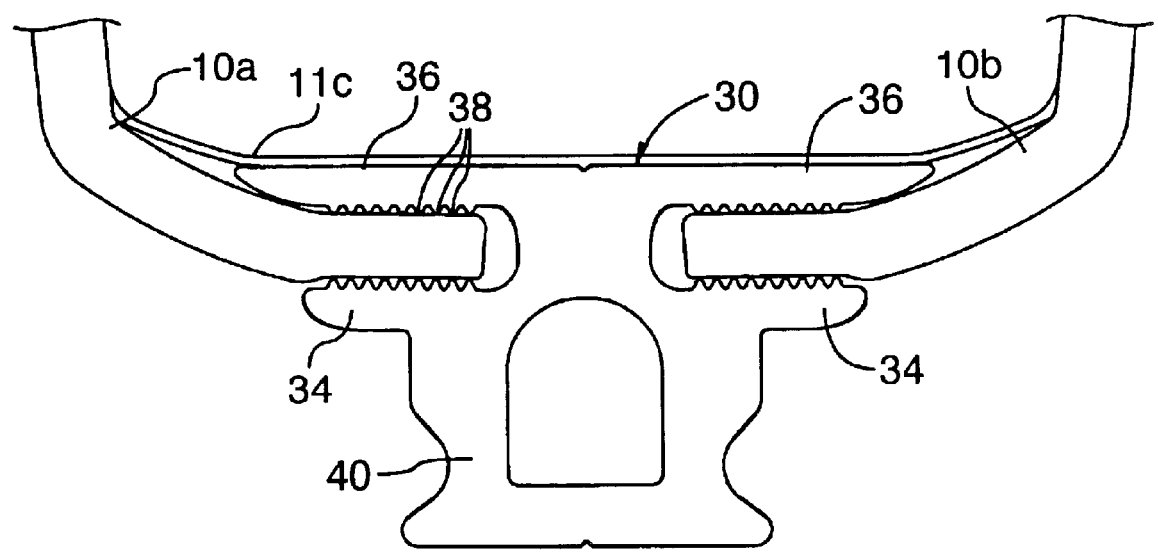
FIG. 6 is a cross-section of the trailing seam anchor with lanyard track.

FIG. 6 illustrates a modified seam anchor strip 30 providing a lanyard track 40 and also having opposed channels 32 each defined between an exterior flange 34 and an interior flange 36. As in the case of the seam anchor strip 20, the flanges 34, 34 of the lanyard track 30 are preferably provided with teeth 38, for lateral engagement of the methacrylate or other glue or epoxy used to secure the trailing edges 18 of the mast halves 10a, 10b. In this case the seam anchor strip 30 further comprises an external profile in the form of a track 40, which may be configured to accommodate any available lanyard hardware. The seam anchor strip 30 is installed only after deflection tests have indicated that the mast 10 has reached the desired resistance to deflection and no further fabric-resin is required to be added to augment the strength of the mast 10, as described below.

The seam anchor strip 20 and lanyard track 30 may be extruded, for example from aluminum or any other suitably strong and weather-resistant material, to the desired thickness and configuration. As noted above, the profile of the lanyard track 40 may be configured to accommodate any custom or commercially available lanyard other rigging hardware.

In the preferred embodiment, the mast 10 or other structural member is constructed as follows:

a. The carbon-graphite fabric is impregnated with epoxy and laid into the molds 2 to create the two mast parts 10a, 10b, having a thickness of initial carbon-graphite layers 11a that is expected to provide the desired resistance to deflection. In the case of a mast, preferably about 70% of the fabric is laid with the fibres oriented in the radial direction and about 30% of the fabric is laid with the fibres oriented in the axial direction.

Optionally the molds 2 for the mast parts are first coated with one or more layers of a finishing paint such as polyester gelcoat paint. Alternatively, the carbon-graphite layers can be applied to the bare molds 2, and the mast or other structural member can be painted after assembly.

b. When the mast parts 10a, 10b have cured, the mast parts 10a, 10b are removed from the molds 2 and positioned adjacent to one another for assembly. Methacrylate is applied to the channels 22 in the seam anchor strip 20, and the seam anchor strip 20 is installed over the leading edges of the mast parts 10a, 10b. Preferably one or more further carbon-graphite layers 11b is applied over the interior of the seam anchor strip 20 overlapping the mast parts 10a, 10b to buttress the joint, as best seen in FIG. 5. The additional layer(s) 11b can be applied through the gap between the trailing edges (which at this stage can still be separated expose the interior of the mast). The methacrylate and additional carbon-graphite layer(s) are left to cure.

c. The lanyard track 30 is temporarily installed (without epoxy) over the trailing edges of the mast parts 10a, 10b, and the partly assembled mast 10 is subjected to deflection testing. If the deflection testing indicates that the mast 10 has not achieved the desired deflection resistance, the trailing edges are separated, and further layers of carbon-graphite fabric are laid along the interior of the mast 10 and allowed to cure. The deflection testing is repeated.

d. Once the mast 10 has achieved the desired deflection resistance, the channels 32 in the lanyard track 30 are filled with methacrylate and the lanyard track 30 is installed along the trailing edges of the mast parts 10a, 10b to complete the assembly of the mast and produce an integral structural member.

e. Optionally, after the methacrylate has cured and the lanyard strip 30 is permanently fixed to the mast halves 10a, 10b, one or more additional layers 11c of carbon-graphite fabric can be applied over the interior of the lanyard strip 30 overlapping the mast parts 10a, 10b to buttress the joint, as shown in FIG. 6. This can be achieved by threading a drawstring lengthwise through the mast 10, drawing epoxy-impregnated carbon-graphite fabric through the open end of the mast 10 over the seam, and running a roller or other pressing member over the additional carbon-graphite layers to set them against the existing layers.

Various embodiments of the present invention having been thus described in detail by way of example, it will be apparent to those skilled in the art that variations and modifications may be made without departing from the invention. The invention includes all such variations and modifications as fall within the scope of the appended claims.

I claim:

1. A method of manufacturing a structural member, comprising the steps of:
    a. Placing resin-impregnated fabric into at least one female mold to create complementary parts of the structural member, up to a desired thickness, for joining along at least two seams;
    b. When the parts have cured, removing the parts from the mold and joining one of the at least two seams by applying adhesive and substantially opposed channels in a seam anchor strip over complementary edges of the one seam;
    c. When the adhesive has set, testing the structural member for deflection, and if the deflection testing indicates that the structural member has not achieved a desired deflection resistance, applying further resin-impregnated fabric along an interior surface of the structural member;
    d. Once the structural member has achieved the desired deflection resistance, applying adhesive and substantially opposed channels in a seam anchor strip over complementary edges of the other of the at least two seams to complete the assembly of the structural member.

2. The method of claim 1 including, at any time after step b., the additional step of applying one or more further layers of resin-impregnated fabric over an interior of the seam anchor strip and overlapping a portion of an interior surface of each of the structural member parts.

3. The method of claim 2 wherein one or more further layers of resin-impregnated fabric is applied over an interior of the seam anchor strip through a gap between parts at an unjoined seam.

4. The method of claim 2 wherein one or more further layers of resin-impregnated fabric is applied over an interior of the seam anchor strip by drawing resin-impregnated fabric through an open end of the structural member and pressing same against interior of the seam anchor strip and a portion of an interior surface of each of the structural member parts.

5. The method of claim 1 including, before step a., the step of coating the one or more molds with one or more layers of a finishing paint.

6. The method of claim 1 in which the opposing channels are provided with teeth for lateral engagement of an adhesive used to secure the edges of the complementary parts.

7. The method of claim 1 in which one or more of the seam anchor strips is provided with an external profile for affixing another element to the seam anchor strip.

8. The method of claim 7 in which the structural member is a mast and the profile is a track for slidably receiving lanyard hardware.

9. The method of claim 1 in which the adhesive comprises methacrylate.

10. The method of claim 1 in which the resin-impregnated fabric has a fibre direction, some of the resin-impregnated fabric being oriented in a radial direction and some of the resin-impregnated fabric being oriented in an axial direction.

* * * * *